3,106,476
METHOD OF REDUCING CLAY VISCOSITY
Nathan Millman and James B. Whitley, Macon, Ga., assignors to J. M. Huber Corporation, Locust, N.J., a corporation of New Jersey
No Drawing. Filed Apr. 20, 1961, Ser. No. 104,226
6 Claims. (Cl. 106—72)

This invention relates to a process for reducing the viscosity of clays and more particularly to the treatment of kaolin clays in such a manner as to produce slips of low viscosity.

A large amount of the Georgia kaolin clay reserves suitable from the standpoint of color and purity for coating paper, fillers for various liquid materials and other known uses of clay, is of a viscosity too high to be satisfactorily used. For example, the coating of paper is seriously affected by the viscosity of the clay being used. If a clay used to coat paper has too much viscosity, it will not flow readily in the coating operation and will hinder the penetration of the adhesive into the base paper to such an extent that the coating is not sufficiently well anchored to the sheet to withstand the pull of tacky inks in printing.

Clay-water mixtures containing from 60% to 80% clay are the most effective and efficient for use as coating and filler clays. Clay-water mixtures containing as high as 68 to 72% clay are often required to be sufficiently fluid to permit free passage through relatively fine screens. Many coating processes also require high solid concentrations in the final coating composition. In some cases, coating mixtures containing 60 to 70% total solids must be of a character which will permit spreading at coating machine speeds and leveling after application to the paper surface. The coating clays, therefore, must be selected so the proper flow or viscosity characteristics are present. Such clays should have a viscosity of not more than about 200 centipoises, as measured by a Brookfield viscometer at 20 r.p.m., in dispersed clay-water suspensions containing 71% clay by weight.

Naturally occurring clays vary in their viscosity characteristics. Since the properties of a refined clay reflect, with only slight modification, the nature of the crude from which it is derived, the production of coating clays with proper flow characteristics is possible only through careful selection of desirable crudes. Such a selection is often difficult and costly due to wide differences in the crude ore, often occurring within short distances in the same deposit. Hence, any method which can appropriately alter the inherent viscosity of naturally occurring clays not only assures the production of clays with uniform and desirable flow properties, but also makes possible a greater consumption of available reserves.

Regardless of the initial viscosity of the raw kaolin, if it is useable at all, its viscosity must be reduced by agitating or kneading with a sufficiently high energy input to effect the desired result. United States Patents 2,535,647 and 2,907,666 to Millman et al. teach methods of reducing viscosity by kneading.

The present invention provides a method for reducing the viscosity of clays by high intensity agitation.

The present invention advantageously permits the reduction in viscosity of clay in dispersed liquid clay-water suspensions containing from 60 to 73% solids with greater ease of handling, less cost of power, simpler equipment and less criticality of conditions than heretofore deemed possible by the prior art processes.

The prior art processes utilize clay suspensions of high solids concentration which present difficulties in handling, since the suspensions are of a plastic consistency and are difficult to pass through the clay refining system without further handling and treatment. By the use of the present invention of using a liquid suspension, the clay is easily passed through the refining system with no need for reslurrying.

The prior art apparatus utilized to reduce viscosity is heavy duty in nature involving high power requirements and is expensive to operate. The apparatus utilized in the present invention is low cost, simple, has a low power requirement, and is inexpensive to operate.

The control of the concentration of solids in the dispersed liquid clay-water suspension is very simple, since a variation of from 60 to 73% solids is permissible without a substantial change in effectiveness of the high intensity agitation because an adequate shearing action is produced within these limits. Furthermore, this range of solids concentration is present in the slurries of the refining operation. In contrast, the prior art process requires delicate controls in order to insure the required plasticity of the clay in order to insure adequate shearing action.

It is an object of this invention to provide an economical method of reducing viscosity of clays in liquid suspension.

It is a further object of the invention to provide a process of reducing viscosity of clay with apparatus of low power requirements.

Another object is to provide a novel process for reducing viscosity of clays, which process is both simple and economical.

Other objects and advantages will be apparent from the following specification.

The invention comprises the process for working a fluid, properly dispersed, clay-water suspension containing 60 to 73% clay solids, in a rotating unit having a peripheral speed of at least 3000 f.p.m. The agitating units applicable can have either an open rotor, semi-enclosed rotor, or totally enclosed rotor. The process is applicable to both crude and refined clays. Crude clay, as used herein, means clay that has not been degritted, fractionated, bleached or filtered, but includes clays that have been blunged. Refined clays, as used herein, mean clays that have had one or more of the steps of degritting, bleaching, fractionating, and filtering performed on them. In the case of refined clay, the process of the invention is applicable to a filter cake composed of either filler or coating material, or a blend of the filter cake and sufficient refined dry clay to produce the desired solids concentration. After treatment of the refined clay, the slurry can be shipped in tank cars in about a 70% suspension, can be dried to produce a predispersed clay or, if desired, can be diluted, flocculated with acid or alum, filtered and the filter cake sections dried to produce an acid-type clay.

The agitating instruments utilized in the examples are of three general types:

(a) OPEN ROTOR MACHINE (STANDARD MIXER)

This is a simple and common type of mixer employing an open rotor. The impeller, with a diameter of 6 inches, is positioned 3 inches above the center of a cylindrical container, 18 inches in diameter. The liquid level is maintained at a height of 12 inches which gives a batch volume of about 13 gallons. The peripheral speed of the impeller can be varied up to about 5300 f.p.m. The impeller is powered by a 3 horsepower motor.

The impeller, as a matter of convenience, was fashioned in the laboratory from 1-inch wide strips of 16 gauge stainless steel. A cross formed from two strips is mounted on the end of a 1-inch shaft to rotate with the thin edge of the strip leading. Each end of the strip is turned up for ½ inch at a 90 degree angle and the verticle portion twisted through about 15 degrees so that the leading edges are slightly closer to the shaft.

(b) SEMI-ENCLOSED ROTOR MACHINE (KADY MILL)

A laboratory Model L Kady is utilized. This machine has a semi-enclosed type rotor. The rotor has a 2-inch diameter and a peripheral speed of about 8600 f.p.m. A water jacketed mixing container having a capacity of about 2000 milliliters is used and 2000 milliliters of slurry is mixed in each test.

The Kady is designed to cause rapid flow of material first through a slotted rotating member and then through apertures in a static member which closely surrounds the rotor. Intensive action is produced by the development of high shearing forces in the space between the rotor and stator and by impingement of a high velocity stream against the walls of the passageway in the stator.

(c) ENCLOSED ROTOR MACHINE (MOREHOUSE MILL)

A Model M Morehouse mill is utilized. This mill consists of a stator and a rotor arranged in spaced apart face-to-face relation with the space between the stator and rotor narrowing toward the peripheries thereof. With the rotor rotating, clay slurry is fed from the center outwardly between the stator and rotor so as to pass through the narrow space therebetween. Shearing action on the clay results from the relative motion of the stator and rotor pulling on the opposite surfaces of the relatively thin film of clay slurry passing between the stator and rotor. In the experiments the diameter of the rotor is 4 inches and its peripheral speed is 3800 f.p.m. The flow rate of the slurry through the mill is controlled by adjusting the distance between the rotor and stator and by the feed pressure. Feed slurry is pumped to the mill by a Moyno pump under pressure up to 20 pounds per square inch. Treatment is limited in the experiments to one pass of the slurry through the mill. A premixing of the suspension at some moderate speed is required prior to its admission into the mill.

Viscosity reduction is effected by the very high shear produced in the fluid system during the brief interval in which the suspension passes between the stator and rotor.

To determine the effect on viscosity of high intensity agitation, clay-water suspensions of from 60 to 73% clay were agitated in the instruments as described above. The experimental clays included crude clays as received from the mine, dried refined products, and filter cake. The latter was used either directly or in combination with sufficient dry clay of a similar type to produce the desired concentration. The samples of agitated clay indicate a lowering of viscosity, as shown in the tables below. The effect on viscosity of such factors as clay particle size, clay concentration, processing time, speed of rotating unit and instrument used are tabulated below.

Viscosity measurements are made with both a low shear instrument, Brookfield viscometer at 20 r.p.m., and a high shear instrument, Hagan viscometer, using dispersed suspensions containing 71% clay by weight.

It is customary, particularly where paper coating clays are concerned, to make viscosity determinations in clay-water suspensions containing 71% clay. The procedure used in the present case follows, with slight modification, the TAPPI Standard Procedure T648.

After the agitation treatment, the clays are prepared for testing in two ways: (1) The clay is dried by pouring the slurry into an electric skillet to a depth of about ⅛ inch. The drying is carefully controlled so that the final moisture of the clay ranges from 2–4%. The final clay is then in a predispersed form. (2) The slurry is diluted to about 40% solids, coagulated with approximately 0.20% alum, based on weight of clay, and filtered. The filter cake is dried to a final clay moisture of about 2–4%. This type of clay is referred to as an acid undispersed product.

The testing procedure is as follows:

500 grams of clay (dry basis) and sufficient water to produce exactly 71% clay solids are slurried for 10 minutes by means of a No. 30 Hamilton Beach mixer. The slurry is then cooled to 25° C. and its viscosity determined by means of a Brookfield viscometer at a spindle speed of 20 r.p.m. The No. 1 spindle is used when the viscosity is below about 400 centipoises and the No. 2 spindle when the viscosity is higher than 400 centipoises.

In the case of predispersed clays, the initial test is made on the clay without chemical treatment. This is followed by adding increments of .05% tetrasodium pyrophosphate, based on dry weight of clay, remixing the slurry, and retesting the viscosity. This procedure continues until a minimum viscosity is established. In the case of undispersed clays, the chemical treatment generally starts at 0.10% tetrasodium pyrophosphate and continues with 0.05% increments until a minimum viscosity is determined.

After the Brookfield viscosity was obtained, a rheogram was made with the Hagan viscometer using the test slurry containing 0.05% dispersing agent in excess of that required to give the minimum Brookfield viscosity value. The rheogram was made with shearing rates covering the range of 0 to 9340 seconds$^{-1}$. Spindle or bob speed was accelerated at a uniform rate requiring 36 seconds to reach the maximum of about 4080 r.p.m.

Apparent viscosity values were determined from the up-curve of the rheograms at approximately midway (1960 r.p.m.) on the shearing rate scale. This point represents a shearing rate of 4500 seconds$^{-1}$. It was not possible to test all the experimental clays at higher shearing rates without exceeding the stress limitation of the instrument. Hence, the midway point was selected so that a viscosity value may be obtained on all clays.

The following experiments show the effect of high intensity agitation of fluid clay-water suspensions on the viscosity of the resulting clay. The effect of such factors as machine speed, clay concentration and time of agitation are tabulated below.

*Example 1.—Effect of Speed of the Rotating Unit on Viscosity*

In this experiment, the open rotor (standard apparatus) is used. In all the tests the time of agitating is kept constant at two hours, and the concentration of the suspension is held at 71% clay.

Two different clays are used: (1) a blend of crude clays and (2) Hydraperse® coating clay which is a spray dried, predispersed product of medium fineness in which 80% of particles by weight are finer than 2 microns. For purposes of this test, the Hydraperse clay is composed of dispersed filter cake (about 62% clay) to which sufficient dry Hydraperse is added to reach the above concentration. The Hydraperse clay contains a dispersing chemical, 0.25% tetrasodium pyrophosphate (TSPP) based on the dry weight of clay. The crude clay is dispersed with 0.2% TSPP based on the dry weight of clay.

Table I shows the effect of peripheral speed of rotating unit on viscosity changes.

TABLE I.—EFFECT OF SPEED ON VISCOSITY

| Peripheral Speed of Rotating Unit, f.p.m. | Minimum Viscosity of Dispersed Clay-Water System at 71% Solids | | | |
|---|---|---|---|---|
| | Hydrasperse | | Crude Clay | |
| | Viscosity Brookfield at 20 r.p.m., cps. | Viscosity Hagan, 4,500 Sec.⁻¹, cps. | Viscosity Brookfield at 20 r.p.m., cps. | Viscosity Hagan, 4,500 Sec.⁻¹, cps. |
| Before treatment | 142 | 878 | 290 | 1,115 |
| 750 | 140 | 750 | | |
| 1,000 | 138 | 720 | 284 | 1,155 |
| 2,000 | 128 | 508 | 190 | 462 |
| 3,365 | 115 | 254 | 144 | 243 |
| 4,300 | 116 | 254 | 144 | 243 |
| 5,300 | 108 | 223 | | |

The results indicate that the reduction in viscosity reaches an optimum value at a peripheral speed of the rotating unit of 3000–3500 f.p.m.

*Example 2.—Effect of Time on Viscosity*

Table II indicates the effect on viscosity of time at varying speeds utilizing the above described clays.

TABLE II.—EFFECT OF AGITATION TIME ON VISCOSITY AT VARYING SPEEDS

| Peripheral Speed of Rotating Unit, f.p.m. | Time, Min. | Minimum Viscosity of Dispersed Clay-Water System at 71% Solids | | | |
|---|---|---|---|---|---|
| | | Hydrasperse | | Crude Clay | |
| | | Viscosity Brookfield at 20 r.p.m., cps. | Viscosity Hagan, 4,500 Sec.⁻¹, cps. | Viscosity Brookfield at 20 r.p.m., cps. | Viscosity Hagan, 4,500 Sec.⁻¹ cps. |
| 750 | 15 | 140 | 860 | | |
| | 30 | 142 | 810 | | |
| | 60 | 140 | 795 | | |
| | 120 | 140 | 750 | | |
| 1000 | 15 | 136 | 820 | | |
| | 30 | 138 | 800 | | |
| | 60 | 136 | 770 | 284 | 1,155 |
| | 120 | 132 | 720 | 284 | 1,155 |
| 2,000 | 15 | 130 | 693 | 218 | 648 |
| | 30 | 132 | 647 | 194 | 509 |
| | 60 | 126 | 508 | 196 | 486 |
| | 120 | 128 | 508 | 190 | 462 |
| 3,365 | 15 | 126 | 500 | 186 | 439 |
| | 30 | 115 | 312 | 182 | 393 |
| | 60 | 115 | 270 | 159 | 324 |
| | 120 | 115 | 254 | 144 | 243 |
| 4,300 | 15 | 124 | 370 | 164 | 369 |
| | 30 | 115 | 300 | 150 | 301 |
| | 60 | 111 | 258 | 145 | 289 |
| | 120 | 116 | 254 | 144 | 243 |
| 5,300 | 15 | 115 | 254 | | |
| | 30 | 110 | 230 | | |
| | 60 | 115 | 220 | | |
| | 120 | 110 | 223 | | |

The results indicate that Hydraperse attains a constant viscosity in about 30–60 minutes at speeds in excess of 3000 f.p.m., whereas the crude clay requires at least 60 minutes to attain an optimum viscosity.

*Example 3.—Comparison of Different Mechanisms as Viscosity Reducers*

A Hydrasperse clay is utilized to compare the effectiveness of the standard apparatus, Kady mill, and Morehouse mill at varying concentraitions. The filter cake slurry contains about 61% clay and dry Hydrasperse was added thereto to prepare suspensions of varying concentrations.

The conditions under which each apparatus operate are described below:

(a) Standard apparatus—peripheral speed of 3365 f.p.m. for 30 minutes. The weight of the clay in the process varies from about 100 to 140 pounds, depending on the slurry concentration.

(b) Kady mill—peripheral speed of about 8600 f.p.m. for 30 minutes. The amount of clay used in the process varies from about 4.25 to 5 pounds, depending on the concentration.

(c) Morehouse mill—peripheral speed of about 3800 f.p.m. Slurry put through the mill at a rate of 13 gallons per hour.

The results are shown in Table III. The viscosity values for the Brookfield and Hagan determinations are reported as shown in Tables I and II.

TABLE III.—VISCOSITY REDUCTION OF HYDRASPERSE CLAY BY DIFFERENT MECHANISMS

| Slurry Concentration | Minimum Viscosity of Dispersed Clay-Water System at 71% Solids | | | | | |
|---|---|---|---|---|---|---|
| | Standard Apparatus | | Kady Mill | | Morehouse Mill | |
| | Brookfield | Hagan | Brookfield | Hagan | Brookfield | Hagan |
| 72 | 118 | 236 | | | 110 | 85 |
| 71 | | | | | 120 | 92 |
| 70 | 126 | 246 | | | 120 | 110 |
| 68 | 130 | 273 | 106 | 94 | 124 | 185 |
| 67 | | | 108 | 115 | | |
| 66 | 138 | 367 | 111 | 136 | 136 | 347 |
| 62 | | | 115 | 220 | | |
| 60 | 140 | 410 | 124 | 230 | | |

The original clay without mechanical treatment had a Brookfield viscosity of 140 centipoises and a Hagan viscosity of 415 centipoises.

The results indicate that high intensity agitation reduces the viscosity of the Hydrasperse clay.

While it is difficult to make a valid comparison between machine performance because of the variation in capacities, it appears that the Kady mill, because of its intense shearing action, is best able to process the more dilute suspensions.

*Example 4.—Effect of Particle Size on Viscosity*

The effect on viscosity of the particle size of the clays listed below was determined with the Kady mill.

The clays used are:

(a) Hydrafine—92% of particles finer than 2 microns;
(b) Hydrasperse—80% of particles finer than 2 microns;
(c) CWF filler clay—36% of particles finer than 2 microns.

Hydrafine, Hydrasperse, and CWF are kaolin clays, mined and refined by J. M. Huber Corporation at Huber, Georgia.

In each case, the filter cake slurry is used directly at its original concentration and the filter cakes are dispersed with about 0.25% TSPP based on dry weight of clay. In all cases, the slurries were subjected to high intensity agitation for 30 minutes.

TABLE IV.—EFFECT OF KADY MILL TREATMENT ON CLAYS OF VARYING PARTICLE SIZE

| Concentration, percent | Minimum Viscosity in Centipoises of Dispersed Clay-Water Systems at 71% Solids | | | | | |
|---|---|---|---|---|---|---|
| | Hydrafine | | Hydrasperse | | CWF | |
| | Brookfield | Hagan | Brookfield | Hagan | Brookfield | Hagan |
| Before Treatment | 170 | 188 | 140 | 415 | 108 | 346 |
| 70 | | | | | 86 | 131 |
| 62 | | | 115 | 220 | | |
| 60.5 | 123 | 81 | | | | |

The results indicate that clays of varying particle size can be reduced in viscosity by the high intensity agitating action of the Kady mill on clay coming directly from the filter.

The viscosity of coarse filler type clays can also be reduced by the Morehouse mill, as shown by the following test.

A filter cake composed of CWF is dispersed with 0.25% TSPP based on dry weight of clay. The slurry contains about 70% clay. Higher concentrations are obtained by adding previously dried clay of a similar type. The slurry is prepared in the standard apparatus controlled to a speed of about 1000 f.p.m. prior to its admission into the Morehouse mill. After treatment in the Morehouse mill, the slurry is diluted to about 40% solids, coagulated with 0.25% alum (based on dry weight of clay), filtered and dried. The results are shown in Table V.

TABLE V.—EFFECT OF TREATMENT OF COARSE FILLER CLAY (CWF) BY A MOREHOUSE MILL

| Concentration, Percent | Flow of Feed Slurry, Gal./Hour | Opening (mm.) | Minimum Viscosity at 71% Solids, cps. | |
|---|---|---|---|---|
| | | | Brookfield | Hagan |
| Original | | | 110 | 430 |
| 74 | 10.5 | 10 | 93 | 178 |
| 72.1 | 10.5 | 8 | 94 | 208 |
| 70.1 | 10.3 | 6 | 101 | 283 |
| 68 | 11 | 4 | 106 | 325 |
| 66 | 10.4 | 3 | 116 | 372 |
| 64.1 | 10.5 | 2 | 125 | 408 |

The results indicate that the best viscosity reductions occur when the concentration exceeds 70%.

The data in both Table IV and Table V indicate that high intensity agitation of clay taken directly in the filter cake form produces a substantial reduction in the viscosity of the clay, and no drying and reslurrying of the filter cake are necessary.

*Example 5.—Viscosity Reduction of Crude Clay*

The crude clay in these tests had an original Brookfield viscosity of 284 centipoises and a Hagan viscosity of 1185 centipoises.

In each case, the crude clay is dispersed with 0.2% TSPP based on dry weight of clay. After the high intensity agitation, the clay was dried to produce a predispersed material. The results are tabulated in Table VI.

TABLE VI.—VISCOSITY REDUCTION OF CRUDE CLAY AS PRODUCED BY THE OPEN ROTOR AND KADY MILL

| Concentration, Percent | Peripheral Speed, f.p.m. | Time, Min. | Minimum Viscosity of Dispersed Clay-Water Systems at 71% Solids, cps. | | | |
|---|---|---|---|---|---|---|
| | | | Open Rotor | | Kady Mill | |
| | | | Brookfield | Hagan | Brookfield | Hagan |
| 71 | 4,300 | 60 | 145 | 243 | | |
| 68 | 8,000+ | 30 | | | 144 | 255 |

The results indicate that a substantial reduction in the viscosity of crude clay is effected by the high intensity agitation of fluid water-clay suspensions.

From the foregoing description of our invention, it is apparent that the high intensity agitation of clay-water suspensions in the liquid state containing 60–73% clay results in a lowering of viscosity. This process can be used in place of the known processes of kneading clay-water suspensions containing 77% clay or more or can be used to supplement the prior art processes to produce desired viscosities. By the use of our invention, desired viscosities can be produced at concentrations of clay in water suspensions heretofore not used, since the liquid water-clay suspensions do not produce sufficient resistance to slow moving elements of powerful heavy duty equipment to produce adequate shearing of the clay particles and resultant reduction in viscosity.

The foregoing is illustrative only and additional modifications may be made without departing from the substance of the invention as defined in the appended claims.

We claim:

1. The method of reducing the viscosity of kaolin clay which comprises subjecting a dispersed kaolin clay-water suspension containing about 62 to 73% kaolin clay by weight and about 38 to 27% water to the shearing action of a mixer element rotating at a peripheral speed sufficient to reduce the viscostiy of said kaolin clay by at least 15%, said speed being at least 3,000 f.p.m.

2. The process of claim 1 wherein the clay is crude kaolin.

3. The process of claim 1 wherein the clay is refined kaolin.

4. The process of claim 1 wherein the clay is dispersed with at least 0.1% of tetrasodium pyrophosphate based on the dry weight of the clay.

5. The process of claim 4 wherein the clay is crude kaolin.

6. The process of claim 4 wherein the clay is refined kaolin.

References Cited in the file of this patent

UNITED STATES PATENTS 2,677,619    Eirich et al. _____ May 4, 1954